United States Patent [19]

Saito et al.

[11] 4,290,906
[45] Sep. 22, 1981

[54] APPARATUS FOR CUTTING CHANNEL BOX FOR FUEL ASSEMBLY AND METHOD THEREFOR

[75] Inventors: Takashi Saito; Masataka Ohwada; Shozo Saito, all of Hitachi, Japan

[73] Assignee: Hitachi, Ltd., Tokyo, Japan

[21] Appl. No.: 64,362

[22] Filed: Aug. 7, 1979

[30] Foreign Application Priority Data

Aug. 14, 1978 [JP] Japan .................................. 53-98189

[51] Int. Cl.³ .......................... G21C 19/32; G21F 9/28
[52] U.S. Cl. ................................. 252/301.1 W; 83/54; 83/425.1; 83/430; 83/440; 83/924; 176/37
[58] Field of Search ................. 252/301.1 W; 176/37; 83/916, 54, 430, 440, 924, 425.1

[56] References Cited

U.S. PATENT DOCUMENTS

3,722,338  3/1973  Cherel .................................... 83/278
4,095,495  6/1978  Chaze et al. ........................... 83/268

FOREIGN PATENT DOCUMENTS

2730723  2/1978  Fed. Rep. of Germany ... 252/301.1 W
53-27795  3/1978  Japan .

*Primary Examiner*—Deborah L. Kyle
*Attorney, Agent, or Firm*—Craig and Antonelli

[57] ABSTRACT

Apparatus including two types of cutting means or roller cutters and shears for cutting a channel box for a fuel assembly for a nuclear reactor and method therefor. The roller cutters and shears are located in the lower portion of a casing having inserted thereinto the channel box from which the fuel assembly has been removed, with the shears being located beneath the roller cutters. The roller cutters continuously cut the channel box axially thereof, while the shears shear the axially-split portions of the channel box in a direction intersecting the center axis of the channel box. Means for outwardly expanding the axially-split portions of the channel box is provided between the roller cutters and the shears. Means for downwardly moving the channel box in the casing is inserted in the casing. Means for drawing off coolant from the casing to clean the latter is connected to the upper portion of the casing.

14 Claims, 11 Drawing Figures

APPARATUS FOR CUTTING CHANNEL BOX FOR FUEL ASSEMBLY AND METHOD THEREFOR

BACKGROUND OF THE INVENTION

This invention relates to apparatus and method for cutting a channel box for a fuel assembly of a nuclear reactor, and more particularly to apparatus for cutting a channel box which is easy to handle and operate.

The core of a nuclear reactor is composed of fuel assemblies. Each fuel assembly includes a cylindrical member for enclosing a plurality of fuel rods containing fissionable material. The cylindrical member for a fuel assembly of a boiling-water reactor is generally referred to as a channel box.

The channel box for a spent fuel assembly withdrawn from the core of a boiling-water reactor is removed from the fuel assembly for storage. However, since the channel box is hollow, a large space is required for storing used channel boxes. To eliminate this problem, several systems for channel box reduction and disposal have been proposed.

One of the channel box reduction and disposal systems is disclosed in Japanese Patent Application Laid-open No. 27795/78 (U.S. Ser. No. 717,166 now abandoned). In this system of the prior art, a plurality of superposed perforations are formed in the wall of a channel box to form axially extending cuts in the channel box. Bits and pieces of channel box material removed from the wall for providing the cuts are received in a container. The channel box plates obtained by cutting are inserted into another container, after being moved thereinto by handling tool means. During a channel box cutting operation, the channel box is gripped by the handling tool means suspended from a hoist. Thus, difficulties have been experienced in the handling and disposal of channel box plates and debris in the prior art method described hereinabove.

SUMMARY OF THE INVENTION

An object of the present invention is to provide an apparatus and method for cutting a channel box for a fuel assembly of a nuclear reactor which enables a channel box cutting operation to be practiced with ease.

Another object is to improve the reduction ratio of a channel box.

Still another object is to provide an apparatus for cutting a channel box for a fuel assembly of a nuclear reactor which is compact in size.

A further object is to prevent scattering of minuscule radioactive materials which might be produced by a channel box cutting operation.

The outstanding characteristics of the present invention include guide means for receiving therein a channel box removed from a fuel assembly, means for pushing and moving the channel box from one of the guide means toward the other end thereof, first cutting means for continuously cutting the channel box axially thereof as the channel box is moved through the guide means, and second cutting means located in the direction of extension of the first cutting means for cutting axially-split portions of the channel box in a direction intersecting the channel box while the channel box is in a condition to be cut by the first cutting means.

DESCRIPTION OF THE PREFERRED EMBODIMENT

A preferred embodiment of the invention will now be described by referring to the accompanying drawings. A fuel assembly of a boiling-water reactor comprises a plurality of fuel elements arranged between upper and lower tie plates and secured at their upper and lower end portions to the upper and lower tie plates, spacers disposed between the upper and lower tie plates for maintaining the fuel elements in predetermined spaced-apart relationship, and a channel box attached to the upper tie plate for enclosing the fuel assemblies.

The channel box of a spent fuel assembly withdrawn from the core of a boiling-water reactor is removed from the fuel assembly. After triangular clips for securing the corners of the upper end portion of the channel box to the upper tie plate are removed, the channel box is cut axially. The principle of cutting the channel box axially will be described by referring to FIGS. 1, 2, 3 and 4.

Figure 1:
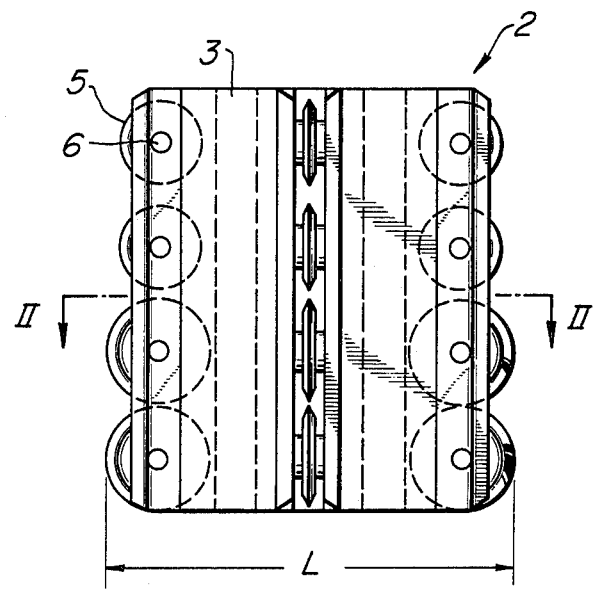
FIG. 1 is a side view of the cutter assembly used in the invention.
Figure 2:
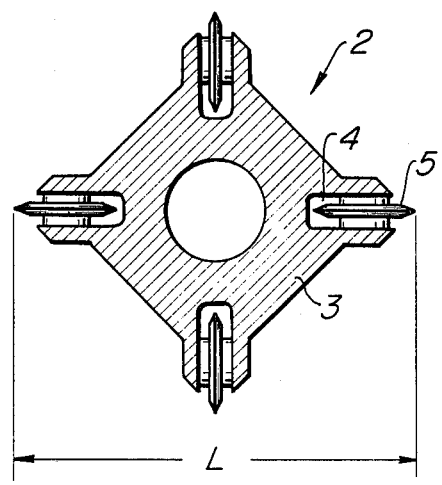
FIG. 2 is a sectional view taken along the line II—II in FIG. 1.

FIGS. 1 and 2 show one embodiment of roller cutter assembly 2. As shown, the roller cutter assembly 2 comprises a main body 3 which is square in cross section, and circular cutter blades 5 received in vertical grooves 4 formed at four corners of the main body 3 and each secured for rotation to the main body 3 through a pin 6. The circular cutter blades 5 are arranged in a plurality of vertical rows axially of the main body 3. The distance L between the outer edges of a pair of circular cutter blades 5 located opposite each other with respect to the center axis of the main body 3 is smaller at one end portion (the upper end portion in FIG. 1) of the main body 3 than at the other end portion (the lower end portion in FIG. 1) thereof. To this end, the circular cutter blades 5 have their diameters gradually increased as their positions move downwardly axially of the main body 3 while the positions in which the pins 6 are secured to the main body 3 remain unchanged axially of the main body 3. Alternatively, the positions in which the pins 6 are secured to the main body 3 may be moved toward the outer edge of the main body 3 as such positions move downwardly axially of the main body 3, in place of varying the diameters of the circular cutter blades 5.

Figure 3:
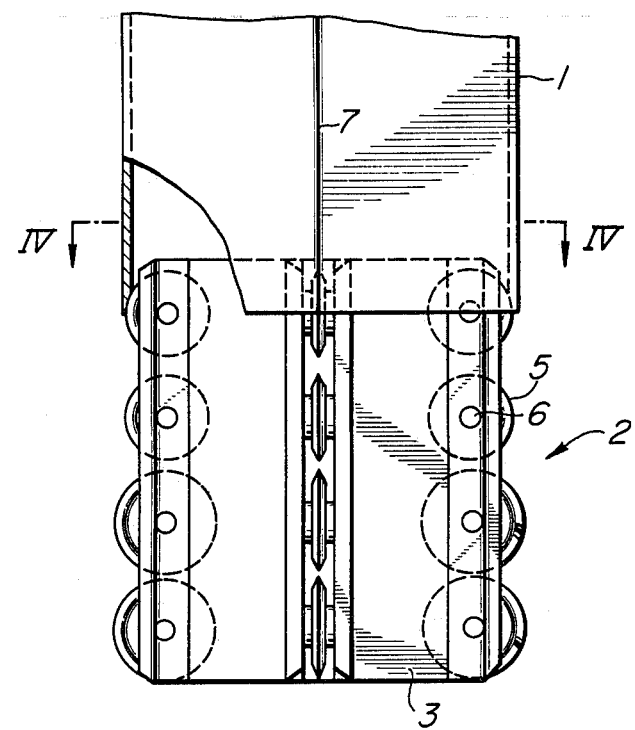
FIGS. 3 and 5 are views in explanation of the principle of axially cutting a channel box according to the invention.
Figure 4:
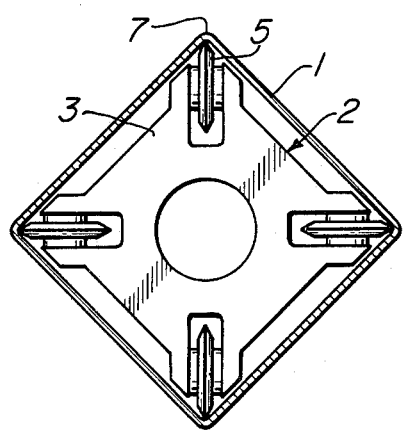
FIG. 4 is a sectional view taken along the line IV—IV in FIG. 3.
Figure 5:
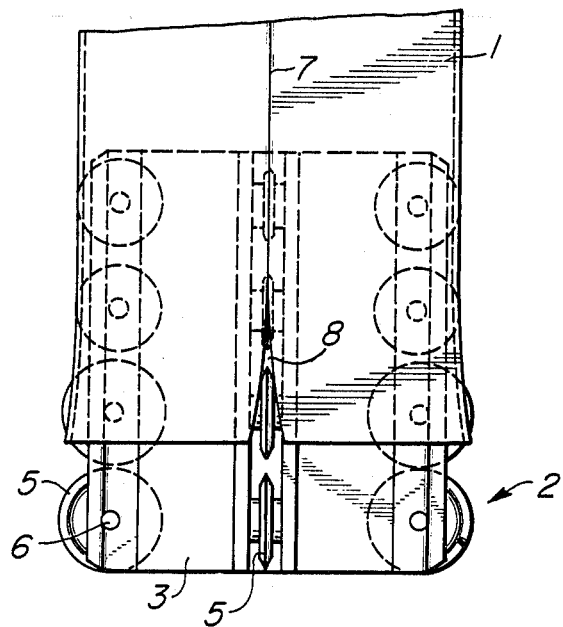

The channel box 1 substantially square in cross section removed from the spent fuel assembly as described hereinabove is brought at one end thereof (the lower end in FIG. 3) into contact with the upper end portion of the cutter assembly 2, as shown in FIG. 3. At this time, the cutter assembly 2 is partially inserted in the channel box 1. The circular cutter blades 5 located at four corners of the main body 3 of the cutter assembly 2 are juxtaposed against the inner surfaces of vertexes 7 of the channel box 1 as shown in FIG. 4. The cutter assembly 2 is fixed. As the channel box is moved downwardly axially thereof, the plurality of circular blades 5 arranged in four vertical rows axially of the main body 3 cut the channel box 1 axially from the inside along the vertexes 7 of the channel box 1. FIG. 5 shows the manner in which the channel box 1 is axially cut as aforesaid. Cuts 8 are formed along the vertexes 7 of the channel box 1 and move upwardly along the vertexes 7 as the channel box 1 is moved downwardly, until the cuts 8 finally reach the upper end of the channel box 1 when the channel box 1 is completely split vertically. With the rotating circular cutter blades 5, the channel box 1 is continuously cut axially thereof so that the crud deposited on the channel box 1 does not readily dislodge therefrom.

Figure 6:
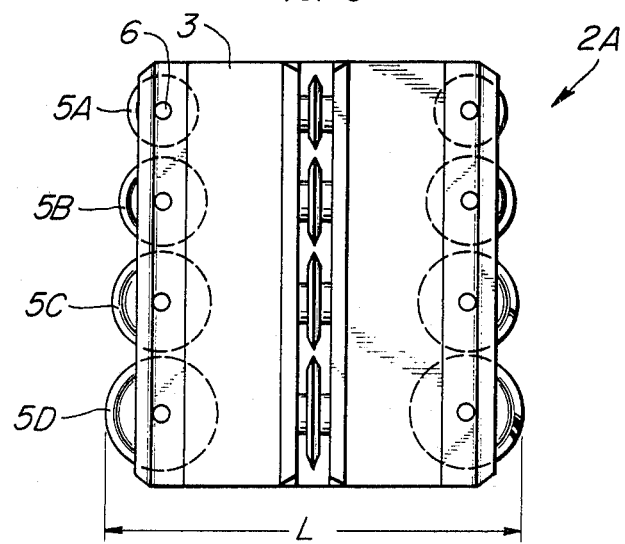
FIG. 6 is a side view of another form of cutter assembly.

FIG. 6 shows another form of cutter means 2A comprising circular cutter blades 5A, 5B, 5C and 5D having their diameters increased in going axially from one end of the main body 3 toward the other end thereof. Thus the distance L increases in going from one end (the upper end in FIG. 6) of the main body 3 toward the other end (the lower end in FIG. 6) thereof. The channel box 1 is first brought into contact with the end portion of the main body having a smaller distance L. The arrangement whereby the distance L is gradually increased in going from one end of the main body 3 to the other end thereof makes it possible to evenly distribute the cuts made in the channel box to all the circular cutter blades 3 arranged axially of the main body 3 and avoid application excessively high load to one row of circular cutter blades 5 alone. This is conductive to prolonged service life of the circular cutter blades 5. The uppermost circular cutter blades 5 serve as guide for moving the channel box 1 axially downwardly.

A preferred embodiment of the present invention will be described by referring to FIG. 7. A channel box cutting apparatus 10 is inserted and installed in a fuel storage pool 9 of a coolant 58, when a fuel assembly replacing operation is performed following shut-down of a boiling-water reactor. The channel box cutting apparatus 10 is withdrawn from the fuel storage pool 9 upon completion of channel box disposal.

Figure 8:
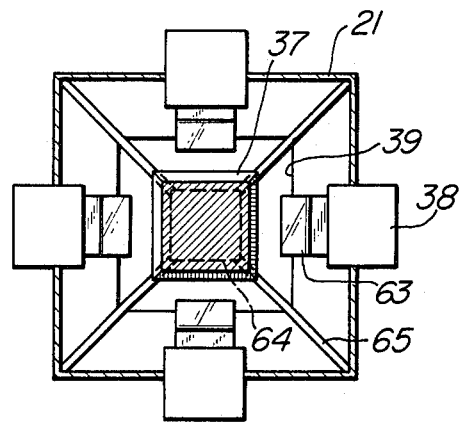
FIG. 8 is a sectional view taken along the line VIII—VIII in FIG. 7.

The channel box cutting apparatus 10 comprises, in addition to the cutter assembly 2, a drive casing 12, casings 13, 14, 21 and 23, a shear assembly 38, and a plates receiving vessel 40. A platform 24 is placed on the bottom 26 of the fuel storage pool 9 of coolant 58. The casing 23 formed with an opening 31 for moving the plates receiving vessel 40 therethrough into and out of the casing 23 is fixed on the platform 24. The casings 21, 14, 43 and 13 are fitted on the casing 23 in the indicated order. The casings 23 and 21 secured to each other through flanges 22A and 22B, while the casings 21 and 14 are secured to each other through flanges 10A and 10B. A fixed blade support 37 of the pyramidal shape is arranged in the casing 21. A suction conduit 45 is connected to the upper end portion of the casing 14. Although not shown in detail, a pump 61 and a cleaning device, such as a filter, 62 fixed on a wall of the pool 9 are connected to the suction conduit 45. The cutter assembly 2 is located in the lower portion of the casing 14 and has the fixed blade support 37 secured to the lower end thereof. As shown in FIG. 8, movable blades 63 of four shears 38 are located in juxtaposed relation to respective fixed blades 54 each mounted on the lower end of each side wall of the fixed blade support 37 of the pyramidal shape. The shears 38 are supported on the casing 21. A support member 64 of the square shape having a sectional area smaller than the sectional area of the lower end of the fixed blade support 37 is attached to the lower end of the fixed blade support 37, and has four support rods 65 each secured at one end thereof to one of four corners of the support member 64 and at the other end thereof to the casing 21. Thus the support rods 65 fix in place the support member 64 and hence the cutter assembly 2 and fixed blade support 37. A shooter 39 is secured to the casing 21.

A base 11 for the drive casing 12 is placed on an upper floor 42 of the fuel storage pool 9. The drive casing 12 is mounted on a guide 49 installed on the base 11. The downwardly extending casing 13 is connected at its upper end to the drive casing 12, and has the casing 43 connected to its lower end. The casings 13 and 43 are secured to each other through flanges 44A and 44B. A pusher member 35 is arranged in the casing 43 and has a plurality of guide rollers 67 mounted on the sides thereof. A feed screw 34 is connected to the upper end of the pusher member 35 and extends through the casing 13 to the drive casing 12. The lower end portion of the feed screw 34 is inserted between a pair of guide rollers 19 mounted in the casing 13 and a seal member 66 disposed beneath the guide rollers 19. The guide rollers 19 perform the functions of supporting and centering the feed screw 34. Speed reducing gearing 33 mounted in the drive casing 12 is in meshing engagement with the feed screw 34 and connected to a motor 32 in the drive casing 12.

A guide rod 56 consisting of an upper guide portion 15 and a lower guide portion 16 is connected to the base 11 of the drive casing 12, in order to increase the rigidity of the casings 13, 14 and 33 and bring the channel box cutter apparatus 10 into a straight position when the latter is assembled. The upper guide portion 15 is fixed to the base 11 and the two guide portions 15 and 16 are connected to each other through flanges 57A and 57B. An arm 46 connected to the casing 13 at one end is rotatably connected to the upper guide portion 15. Arms 17A and 17B connected at one end to the casing 14 are connected at the other end to the lower guide portion 16 through pins 18A and 18B respectively.

Figure 10:
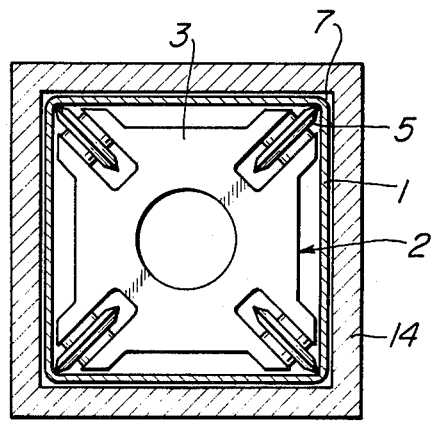
FIG. 10 is a sectional view taken along the line X—X in FIG. 10.
Figure 9:
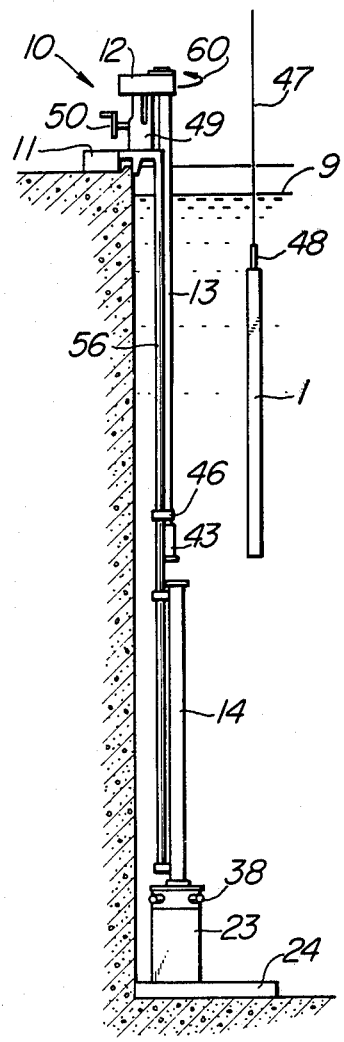
FIG. 9 is a view in explanation of the manner in which a channel box is being inserted in the apparatus for cutting a channel box shown in FIG. 7.
Figure 11:
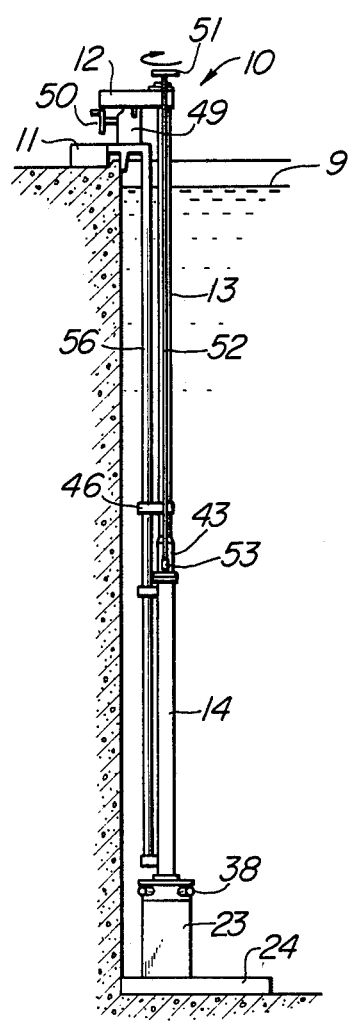
FIG. 11 is a view in explanation of the manner in which insertion of a channel box into the apparatus for cutting a channel box shown in FIG. 7 is completed.

A channel box cutting operation by means of the channel box cutting apparatus 10 will now be described. A spent fuel assembly, not shown, withdrawn from the core of a boiling-water reactor is transferred to the fuel storage pool 9 of coolant 58, in which the channel box 1 of about 4 m in length is removed from the fuel assembly by means of a channel detacher, not shown. The channel box 1 is temporarily stored on a channel storage rack, not shown, in the fuel storage pool 9. A suspender 48 connected to a rope 47 as shown in FIG. 9 is fastened to the aforesaid pair of clips near the lower end of the channel box 1 to lift the latter. The channel box 1 hung from the rope 47 is moved to the vicinity of the casing 14 of the channel box cutting apparatus 10, as shown in FIG. 9. A handle 50 of the drive guide 49 on the base 11 is manipulated to move the drive casing 12 upwardly. As the drive casing 12 moves upwardly, the casings 13 and 43 also move upwardly. When the casing 43 has moved upwardly a predetermined amount, the drive casing 12 is swung in the direction of an arrow 60 about the drive guide 49 as shown in FIG. 9. The casing 43 is moved sideways from the upper end of the casing 14, and the upper end of the casing 14 opens in the fuel storage pool 9. Then the channel box 1 hung from the rope 47 is moved to a position above the casing 14 and inserted into the casing 14 by moving the rope 47 downwardly. The casing 14 is square in cross section as is the case with the channel box 1, as shown in FIG. 10. Upon completion of insertion of the channel box 1 into the casing 14, the suspender 48 is removed from the channel box 1 by means of tongs, not shown. Thereafter, the clips attached to the upper end of the channel box 1 are removed therefrom by means of tongs, not shown, and moved outside the channel box cutting apparatus 10 while being held by the tongs. The drive casing 12 is swung in a direction opposite to the direction of the arrow 60 to move the casing 43 to a position above the casing 14. Turning the handle 50 in the opposite direction results in the drive casing 12 moving downwardly, to bring the casing 43 into contact with the casing 14 as shown in FIG. 11. Upon completion of centering of the casing 43 and 14 with each other, a handle 51 (See FIG. 11) attached to the drive casing 12 is turned to rotate a bolt wrench 53 connected to the lower end of a rotary rod 52 connected in turn to the handle 51. By this operation, the casings 43 and 14 are unitarily connected to each other. Although not shown, a detector is used for ascertaining the position of the upper end of the channel box 1 to ensure that the channel box 1 is inserted in the casing 14.

After the presence of the channel box 1 in a predetermined position in the casing 14 is ascertained, the motor 32 is actuated to transmit power through the speed reducing gearing 33 to a nut 68 having a gear wheel at its outer periphery. Rotation of the nut 68 causes the feed screw 34 to rotate and move downwardly. The numeral 69 in FIG. 7 designates a stopper for preventing the nut 68 from moving vertically. The pusher member 35 moves downwardly together with the feed screw 34 and is brought into contact with the upper end of the channel box 1 in the casing 14. Further downward movement of the pusher member 35 moves the channel box 1 downwardly in the casing 14 which serves as a guide for the downward movement of the channel box 1. The lower end of the channel box 1 is in contact with the upper end of the cutter assembly 2, so that as the channel box 1 moves downwardly in the casing 14, the cuts 8 are formed along the four vertexes 7 of the channel box starting at the lower end of the channel box 1, as shown in FIG. 5. The lower end portion of the channel box 1 severed into plates by the cuts 8 moves downwardly while being expanded outwardly along the fixed blade support 37 of the pyramid shape, into the casing 21. The channel box 1 axially cut by the cutter assembly 2 in moving downwardly is sheared radially by the movable blades 63 of the four shears 38 juxtaposed against the respective fixed blades 54 as each of the movable blades 63 is moved in a direction 55 indicated by an arrow intersecting the center axis of the channel box 1, with a result that the channel box 1 is cut into plates of about 150 mm in length. The axially-split channel box 1 is expanded outwardly on four sides by the fixed blade support 37 of the pyramidal shape, so that the channel box 1 is sheared at once into plates of the predetermined length without the blades 63 of the shears 38 interfering with one another. Impacts are applied simultaneously from opposite directions to the fixed blade support 37 by the shears 38 and cancel each other out, thereby avoiding displacement of the center axis of the fixed blade support 37 or deformation thereof. The plates produced by cutting the channel box 1 are passed through the shooter 39 to the plates receiving vessel 40. By shearing the channel box 1 radially as aforesaid, reduction of the channel box 1 is greatly enhanced.

While a channel box cutting operation is being performed, the pump 61 is actuated to draw off the coolant 58 from the casing 14 through the suction conduit 45. Radioactive materials, such as minuscule bits and pieces of metal produced when the channel box 1 is cut and ferrous crud dislodging from the channel box 1 (the ferrous crud is dislodged mainly by the action of shears 38), can be removed from the casings 14, 21 and 23 as the coolant 58 is drawn off from the casing 14 through the suction conduit 45, because the coolant 58 flowing through the opening 31 into the casing 23 flows upwardly successively through the casings 23, 21 and 14. The casings 14, 21 and 23 have the function of restricting the dispersion of the bits and pieces of metal and ferrous crud. The minuscule metal bits and ferrous crud incorporated in the coolant 58 flowing through the suction conduit 45 can be removed from the coolant 58 by the cleaner 62. After the metal bits, etc., are removed, the coolant 58 is returned to the fuel storage pool 9, so that no change occurs in the volume of coolant 58 in the fuel storage pool 9. The minuscule bits and pieces of metal produced by the cutter assembly 2 and shears 38 as they cut the channel box 1 are removed together by the cleaner 62. Thus the present invention offers the advantage that scattering in all direction of minuscule metal bits of high radioactivity in the fuel storage pool, that occurred when methods of the prior art for cutting the channel box were used, can be avoided.

Although not shown, a stopper is provided at each side of the fixed blade support 37 of the pyramid shape in a position below each fixed blade 54. Each stopper is spaced apart from the respective fixed blade 54 a distance of about 150 mm. When the shears 38 are inoperative, the stoppers project in four directions from the fixed blade support 37 of the pyramid shape to support the lower ends of the axially-split portions of the channel box 1. When the shears 38 are rendered operative, the stoppers move toward the fixed blade support 37, so that the stoppers do not prevent the plates of the predetermined length produced by cutting the channel box from moving downwardly. However, the stoppers prevent the axially-split portions of the channel box 1 that have not been sheared by the shears 38 yet from moving downwardly. When the plates of the predetermined length produced by cutting the channel box 1 received in the plates receiving vessel 40 provided with wheels 41 have reached a predetermined amount, the plates receiving vessel 40 is moved, through the opening 31, out of the casing 23, to be stored in the fuel storage pool 9. The upper end of the plates receiving vessel 40 is closed by a lid, to prevent the crud on the plates from dislodging and scattering in the coolant 58 in the fuel storage pool 9.

The channel box cutting apparatus 10 according to the present invention eliminates the need to perform the operation of removing the plates (about 14 m long and 13 cm wide) from the casing in which the channel box 1 was cut and transferring same to the plates receiving vessel, which must be performed when channel box disposal apparatus of the prior art are used. No metal pieces that would be produced when the walls of the channel box 1 are punched to form perforations therein are produced when the apparatus 10 is used, and only the plates produced by axially splitting the channel box 1 and radially shearing same are accumulated in the plates receiving vessel 40. What is needed to be done is merely to move the plates receiving vessel 40 out of the channel box cutting apparatus 10, so that handling of the channel box 1 after it is cut is facilitated. The cutting apparatus 10 is more compact than cutting apparatus of the prior art which require vessels for the two types of debris or the plates produced by cutting the channel box 1 and the small bits and pieces of metal produced when a cutting operation is performed. The mechanism for axially splitting the channel box 1 is much simpler in construction and cutting can be practiced more smoothly by the cutting apparatus 10 in which the circular cutter blades 5 are used for continuously cutting the channel box 1 axially while the blades 5 rotate than by cutting apparatus of the prior art in which perforations are formed by intermittently punching the walls of the channel box.

Particularly, the arrangement in which the cutter assembly 2 and the shears 38 are vertically continuously mounted one over the other offers the following advantages. First, the channel box 1 is axially split by the cutter assembly 2 and the axially-split portions are immediately sheared radially to produce plates of a predetermined length, in place of shearing the channel box radially after the latter is completely split axially. This is conducive to reduced time required for cutting the channel box 1. No special means is required for removing the axially split portions of the channel box 1 from the casing. The movement of the channel box 1 necessary for effecting cutting thereof by the cutter assembly 2 and the shears 38 can be effected by the movement of the pusher member 35. Thus it is possible to obtain a compact overall size in a channel box cutting apparatus.

The idea of first axially splitting the channel box 1 into four plates and then shearing the four plates radially by the shears 38 may come to mind. However, if this idea is put into practice, it would be necessary to remove from the casing the four plates produced by cutting the channel box 1 and move same to a position in which shearing is practiced, thereby making it necessary to provide plates moving means and making the channel box cutting apparatus and operation complex. In the embodiment of the present invention, there is no need to remove from the casing the axially-split portions of the channel box 1, and the channel box can be moved downwardly merely by moving the pusher member 35 downwardly to perform the cutting and shearing operation. Thus the channel box cutting operation is markedly simplified and can be practiced readily. In addition, the cutting apparatus 10 can be reduced in size as compared with cutting apparatus of the prior art.

Alternatively, the cutter assembly 2 including circular cutter blades 5 may be mounted on the casing 14 for axially cutting the channel box 1 along the vertexes 7 thereof by the circular cutter blades 5 from outside. When this is the case, the apparatus 10 will become larger in size and more complex in construction than the apparatus 10 shown in FIG. 7, because the lower end portion of the casing 14 would become larger in cross section and the shape of the casing 14 would become complex.

Figure 7:
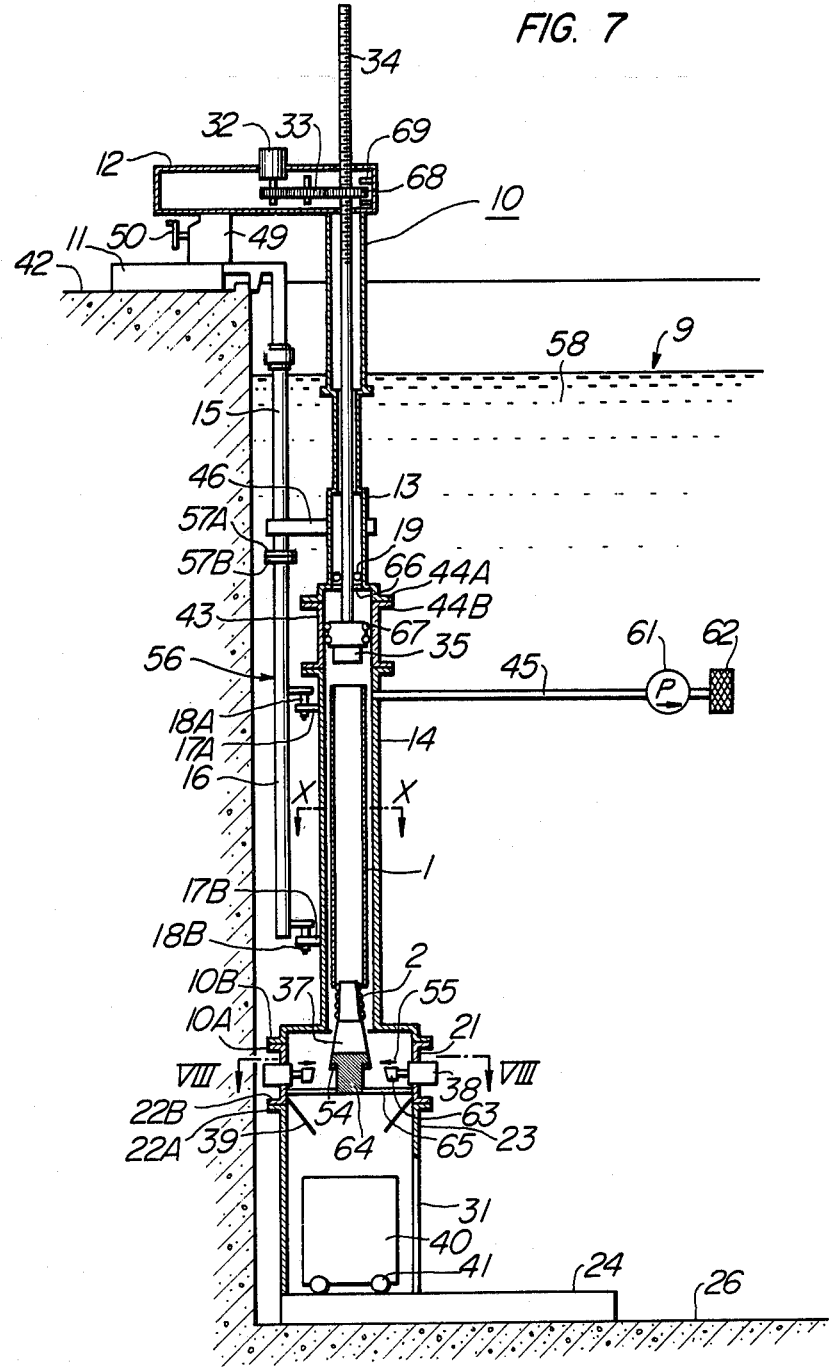
FIG. 7 is a vertical sectional view of the apparatus for cutting a channel box for a fuel assembly of a nuclear reactor comprising one embodiment of the invention.

In applying the cutting apparatus 10 shown in FIG. 7 to the disposal of a flared channel for a fuel assembly of a fast neutron reactor, it would be necessary to render the sectional shape of the casing 14 hexagonal and to arrange six circular cutter blades of a cutter assembly in the same cross section, because the flared channel is hexagonal in cross-section.

The present invention avoids the production of metal bits which would be produced when perforations are formed by punching the channel box and facilitates the disposal of the channel box.

We claim:

1. Apparatus for cutting a channel box for a fuel assembly, comprising:
   guide means having the channel box inserted therein following its removal from the fuel assembly, said channel box being formed with a plurality of axially extending vertexes;
   means for pressing against said channel box and for moving said channel box from one end of said guide means to the other end thereof;
   first cutting means axially fixedly mounted for continuously cutting said channel box axially along said vertexes as the channel box is being moved through said guide means; and
   second cutting means positioned downstream of said first cutting means in the direction of movement of said channel box for cutting said channel box in a direction intersecting the axis thereof while said channel box is being supported in a condition in which the channel box can be cut axially by said first cutting means.

2. Apparatus for cutting a channel box as claimed in claim 1, wherein said first cutting means comprises a plurality of roller cutters.

3. Apparatus for cutting a channel box as claimed in claim 1 or 2, wherein said second cutting means comprises a plurality of shears.

4. Apparatus for cutting a channel box as claimed in claim 3, further comprising means provided between said first cutting means and said plurality of shears for outwardly expanding the axially-split portions of the channel box.

5. Apparatus for cutting a channel box for a fuel assembly, comprising:
   casing means located in a body of coolant for receiving therein the channel box after its removal from the fuel assembly, said channel box being formed with a plurality of axially extending vertexes;
   means provided in said casing means for pressing against said channel box and for moving said channel box downwardly from an upper portion to a lower portion of said casing means;
   first cutting means secured at the lower end portion of said casing means for continuosly cutting said channel box axially along said vertexes as said channel box is being moved downwardly, said first cutting means being prevented from moving axially; and
   second cutting means located in said casing means in a position in the direction of movement of said channel box for cutting said channel box in a direction intersecting the axis thereof while said channel box is being supported in a condition in which said channel box can be continuously cut axially by said first cutting means.

6. Apparatus for cutting a channel box as claimed in claim 5, further comprising means connected to the upper portion of said casing for cleaning the interior of said casing by drawing off the coolant therefrom.

7. Apparatus for cutting a channel box as claimed in claim 6, wherein said means for drawing off coolant from said fixed casing portion is connected to the upper end portion of the fixed casing portion.

8. Apparatus for cutting a channel box as claimed in claim 5, wherein said casing means is composed of a fixed casing portion and a movable casing portion, and further comprising a guide rod supporting said fixed casing portion and mounting said movable casing portion for rotation, said means for pressing and moving downwardly said channel box being inserted into said movable casing portion through the upper end portion thereof.

9. Apparatus for cutting a channel box as claimed in one of claims 5, 6, 8 or 7, wherein said first cutting means comprises a plurality of roller cutters.

10. Apparatus for cutting a channel box as claimed in claim 9, wherein said second cutting means comprises a plurality of shears.

11. Apparatus for cutting a channel box as claimed in claim 10, further comprising means provided between said roller cutters and said shears for outwardly expanding the axially-cut portions of the channel box.

12. Apparatus for cutting a channel box as claimed in one of claims 5, 6, 8 or 7, further comprising a passage defined between the outer surfaces of said first cutting means and the inner surfaces of said casing for allowing the axially-cut portions of the channel box to pass therethrough.

13. Apparatus for cutting a channel box as claimed in claim 5, wherein said first cutting means is disposed in juxtaposed relation to said axially extending vertexes of said channel box and said second cutting means is disposed in a region extending between adjacent axially extending vertexes of said channel box.

14. A method of cutting a channel box for a fuel assembly, comprising the steps of:
inserting the channel box in a guide means following its removal from the fuel assembly, the channel box being formed with a plurality of axially extending vertexes;
pressing against the channel box and moving the channel box from one end of the guide means to the other end thereof;
cutting the channel box axially by first cutting means along the axially extending vertexes as the channel box is being moved through the guide means; and
cutting portions of the channel box, cut axially by the first cutting means, by second cutting means in a direction intersecting the axis of the channel box, the first cutting means being prevented from moving axially, and the second cutting means being disposed in a position in the direction of movement of the channel box for cutting the channel box in a direction intersecting the axis thereof while the channel box is being supported in a condition in which the channel box can be cut axially by the first cutting means.

* * * * *